April 17, 1951 W. J. HAMAN 2,549,462
FISHERMAN'S PLIERS
Filed Oct. 25, 1946
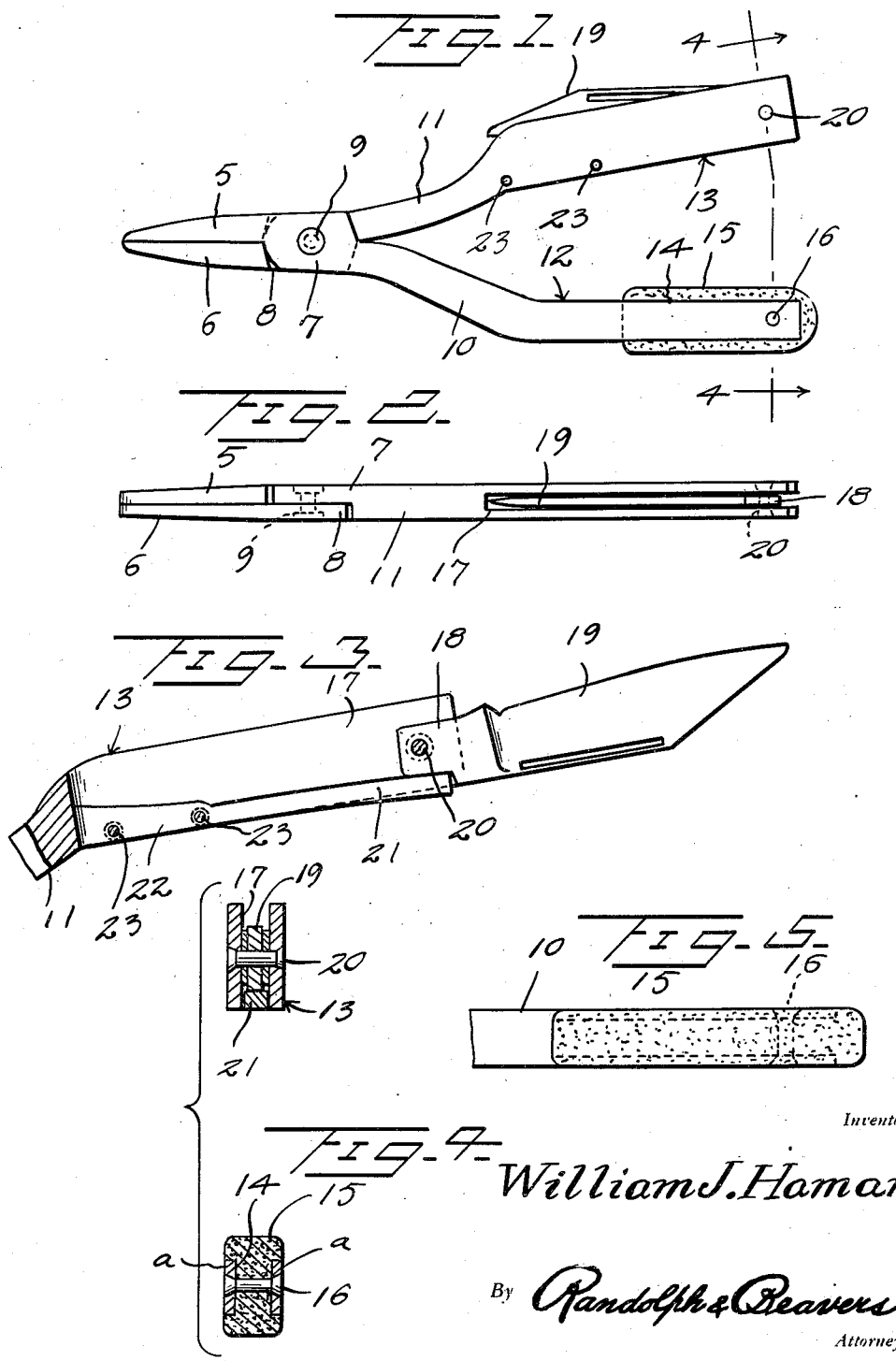
Inventor
William J. Haman
By Randolph & Beavers
Attorneys Patented Apr. 17, 1951

2,549,462

UNITED STATES PATENT OFFICE 2,549,462

FISHERMAN'S PLIERS

William J. Haman, Trona, Calif.

Application October 25, 1946, Serial No. 705,648

1 Claim. (Cl. 51—205)

The present invention appertains to implements for use by fishermen and more particularly to a device in the form of pliers, capable of being used for many purposes in connection with fishing.

An important object of the invention is to provide a fisherman's implement having handle portions, each provided with an adjunct, capable of being used in different operations in connection with the art of fishing.

Another object of the invention is to provide a fisherman's tool in the form of pliers, one handle of which is provided with an insert, which besides serving as a hand grip, can be used for rubbing hooks and performing other operations incident to the maintenance of equipment.

A further object of the invention is to provide a fisherman's pliers, which incorporates a combination of device in one implement capable of serving sundry purposes.

These and various other objects and advantages of the invention will become apparent to the reader of the following description.

In the drawing:

Figure 1 is a plan view of the implement;

Figure 2 is an edge elevational view;

Figure 3 is an enlarged fragmentary longitudinal sectional view through one handle of the implement and showing the blade in extended position;

Figure 4 is an enlarged cross section, taken on line 4—4 of Figure 1;

Figure 5 is a fragmentary edge elevational view showing the utility insert of the handle complemental to the knife carrying handle.

Referring to the drawing, the implement is in the form of pliers, having jaws 5, 6, the inner ends of which have offset portions 7, 8, respectively, pivotally secured together by a suitable pivot element 9 and from which jaw shanks 10, 11 diverge, as in the manner shown in Figure 1.

Obliquely, with respect to the shanks 10, 11, project handle structures generally referred to by numerals 12, 13.

The handle structure 12 is bifurcated to define a slot 14 extending longitudinally inwardly from the butt end thereof to receive an elongated, substantially rectangular shaped body 15, this body having chamfered, or depressed side portions for snugly receiving the thus formed furcations a, a. A pin or rivet 16 is disposed through openings in the furcations and the body 15 to hold these parts firmly together.

As is clearly shown in Figure 1, the longitudinal edge portions and the butt end of the body 15 project outwardly beyond the perimeter of the handle 12. The outermost portion of the body 15 acts as a hand grip in actuating the handles and due to the fact that this body 15 is of fibrous material, it will be found very suitable for rubbing or cleaning fish hooks and performing various other functions in connection with the maintenance of fishing equipment.

The handle 13 is likewise bifurcated for a substantial distance inwardly of its butt end to define a slot 17 for the reception of the shank portion 18 of a knife blade 19, the shank portion 18 being pivotally connected to the handle 13 at the outer end portion thereof, by a pivot member 20. The shank portion 18, when extended has the elongated spring finger 21 of a bar 22 bearing against the same to hold the knife firmly in projected or extended position, the inner end of the bar 22 being anchored by pins or other members 23 to the handle structure 13. Obviously, when the knife blade 19 is swung inwardly, the force of the spring 21 is overcome and when disposed to the closed position shown in Figure 1, the opposite edge portion of the shank 18 is engaged by the spring finger 21 to hold the knife in closed position.

Thus it can be seen, that both handles of the implement are provided with utilities capable of being employed for manifold purposes in the art of fishing.

While the foregoing description sets forth the invention in specific terms, it is to be understood that numerous changes in the shape, size and materials may be resorted to, without departing from the spirit and scope of the invention as claimed hereinafter.

Having described the invention, what is claimed as new is:

A device of the character described including a handle, said handle being bifurcated inwardly from its free end, a cleaning and rubbing body having opposite side portions chamfered to receive the furcations of the bifurcated end of the handle, a rivet interconnecting the bifurcated end of the handle and the body, said body at its outer end and side portions projecting outwardly from the adjacent end and side portions of the bifurcated handle.

WILLIAM J. HAMAN.

REFERENCES CITED

The following references are of record in the file of this patent:

UNITED STATES PATENTS

| Number | Name | Date |
|---|---|---|
| 187,483 | Rightor | Feb. 20, 1877 |
| 404,667 | Woodhouse | June 4, 1889 |
| 610,305 | Mino et al. | Sept. 6, 1898 |
| 1,147,510 | Johnson | July 20, 1915 |
| 1,428,357 | Bullard | Sept. 5, 1922 |
| 1,617,592 | Hardy | Feb. 15, 1927 |
| 1,644,464 | Cain et al. | Oct. 4, 1927 |
| 2,262,907 | Assen | Nov. 18, 1941 |